United States Patent
Sajid

(10) Patent No.: US 11,555,766 B2
(45) Date of Patent: Jan. 17, 2023

(54) ULTRASOUND-ASSISTED SOLVENT EXTRACTION OF ANALYTES FROM POROUS MEMBRANE PACKED SOLID SAMPLES

(71) Applicant: KING FAHD UNIVERSITY OF PETROLEUM AND MINERALS, Dhahran (SA)

(72) Inventor: Muhammad Sajid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 50 days.

(21) Appl. No.: 16/245,994

(22) Filed: Jan. 11, 2019

(65) Prior Publication Data
US 2020/0225131 A1 Jul. 16, 2020

(51) Int. Cl.
| | |
|---|---|
| *G01N 1/40* | (2006.01) |
| *B01D 11/02* | (2006.01) |
| *G01N 30/00* | (2006.01) |
| *G01N 30/02* | (2006.01) |
| *G01N 30/06* | (2006.01) |

(52) U.S. Cl.
CPC ......... *G01N 1/4055* (2013.01); *B01D 11/028* (2013.01); *B01D 11/0265* (2013.01); *B01D 2252/205* (2013.01); *B01D 2257/7027* (2013.01); *G01N 2001/4061* (2013.01); *G01N 2001/4094* (2013.01); *G01N 2030/009* (2013.01); *G01N 2030/025* (2013.01); *G01N 2030/062* (2013.01)

(58) Field of Classification Search
CPC ......... G01N 2001/4061; G01N 1/4055; B01D 11/0265
See application file for complete search history.

(56) References Cited

U.S. PATENT DOCUMENTS

| | | | |
|---|---|---|---|
| 9,075,037 B2 | 7/2015 | Basheer et al. | |
| 2016/0122685 A1* | 5/2016 | Martinsen | B01D 11/0215 554/8 |

FOREIGN PATENT DOCUMENTS

| | | |
|---|---|---|
| CN | 101315352 B | 5/2011 |
| CN | 105136931 A | 12/2015 |
| CN | 103992371 B | 4/2017 |

OTHER PUBLICATIONS

Sajid, Muhammad, Mateusz Kacper Wozniak and Justyna Plotka-Wasylka, "Ultrasound-assisted solven extraction of porous membrane packed solid samples: A new approach for extraction of target analytes from solid samples" Microchemical Journal 144 (2019) 117-123, Aug. 29, 2018. (Year: 2018).*

(Continued)

*Primary Examiner* — Paul M. West
(74) *Attorney, Agent, or Firm* — Oblon, McClelland, Maier & Neustadt, L.L.P.

(57) ABSTRACT

A method for extracting an analyte from a solid sample is described. The sample is sealed in a porous membrane bag, which is sonicated in an organic solvent. An extract of the analyte forms in the bag and diffuses into the organic solvent. The organic solvent containing the extract may then be concentrated and analyzed for an analyte with gas chromatography-mass spectrometry. The method does not the use of a solid sorbent material, and does not require a step of centrifuging or filtering.

20 Claims, 3 Drawing Sheets

(56) References Cited

OTHER PUBLICATIONS

M. Sajid et al., "Ultrasound-assisted solvent extraction of porous membrane packed solid samples: A new approach for extraction of target analytes from solid sample" Microchemical Journal, vol. 144, Jan. 2019, pp. 117-123.

M. Fayazi et al., "Combination of carbon nanotube reinforced hollow fiber membrane microextraction with gas chromatography-mass spectrometry for extraction and determination of some nitroaromatic explosives in environmental water" Analytical Methods, vol. 5, Issue 6, Jan. 14, 2013, pp. 1-5 (Abstract Only).

W. Khayoon et al., "Micro-solid phase extraction with liquid chromatography—tandem mass spectrometry for the determination of aflatoxins in coffee and malt beverage" Food Chemistry, vol. 147, Mar. 15, 2014, pp. 287-294 (Abstract Only).

W. Khayoon et al., "High performance liquid chromatographic determination of aflatoxins in chilli, peanut and rice using silica based monolithic column" Food Chemistry, vol. 133, 2012, pp. 489-496.

M. Ghazaghi et al., "Ultrasound-assisted dispersive solid phase extraction of cadmium(II) and lead(II) using a hybrid nanoadsorbent composed of graphene and the zeolite clinoptilolite" Springer Link, vol. 182, Issue 7-8, Jun. 2015, pp. 1263-1272 (Abstract Only).

P. Pereira et al., "Determination of 16 Priority Polycyclic Aromatic Hydrocarbons in Particulate Matter by HRGC-MS after Extraction by Sonication" Analytical Sciences, vol. 17, Oct. 2001, pp. 1229-1231.

\* cited by examiner

ULTRASOUND-ASSISTED SOLVENT EXTRACTION OF ANALYTES FROM POROUS MEMBRANE PACKED SOLID SAMPLES

STATEMENT REGARDING PRIOR DISCLOSURES BY THE INVENTORS

Aspects of this technology are described in a published article, "Ultrasound-assisted solvent extraction of porous membrane packed solid samples: A new approach for extraction of target analytes from solid samples," by Sajid, Muhammad; Woźniak, Mateusz Kacper; and Płotka-Wasylka, Justyn, in *Microchemical Journal,* 144 (2019) 117-123, DOI: 10.1016/j.microc.2018.08.059, available online Aug. 29, 2018, which is incorporated herein by reference in its entirety.

STATEMENT OF ACKNOWLEDGEMENT

The Inventor would like to acknowledge the Center for Environment and Water, Research Institute, at King Fahd University of Petroleum and Minerals, Dhahran, Saudi Arabia.

BACKGROUND OF THE INVENTION

Technical Field

The present invention relates to a method of extracting analytes from solid samples using sonication.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Despite all the major developments in analytical instrumentation, sample preparation is of critical importance in quantification of analytes in various matrices. The need for sample preparation arises due to the demand of trace level quantification, regulatory obligations, and complex matrix compositions. See M. Sajid, J. Płotka-Wasylka, Combined extraction and microextraction techniques: Recent trends and future perspectives, TrAC—Trends Anal. Chem. 103 (2018) 74-86. doi:10.1016/j.trac.2018.03.013, incorporated herein by reference in its entirety. One of the major objectives of sample preparation is to convert the sample into a form that can be introduced and analyzed by the analytical instrument. This can be accomplished by the removal of interferences, separation, and/or preconcentration of analytes, and (if required) conversion of the analytes into more suitable derivatives. See M. Sajid, et al., Trends Anal. Chem. 103 (2018) 74-86. doi:10.1016/j.trac.2018.03.013, incorporated herein by reference in its entirety. The selection of a suitable sample preparation method and analytical instrument has great significance in developing an analytical method.

As far as sample preparation is concerned, liquid-liquid extraction (LLE) and solid phase extraction (SPE) are two commonly used classical extraction techniques. They have advantages of better clean up and good extraction recoveries. However, both techniques consume large amounts of hazardous organic solvents and consist of multistep procedures. In addition, SPE also requires selective adsorbents for proper retention of the analytes. The synthesis of selective adsorbents involves the use of different chemicals in large quantities. In this way, both techniques are not environmentally friendly; also, they are time and labor intensive. As an alternative to classical LLE and SPE, research in the area of sample preparation is progressing toward the development of microextraction approaches that are characterized by miniaturization, simplification, and automation. Hence, the use of large amounts of organic solvents, synthetic sorbents, and samples can be avoided. Solid phase microextraction, liquid phase microextraction, dispersive liquid-liquid microextraction, porous membrane-protected micro-solid-phase extraction, and their modified versions are some examples of widely accepted microextraction techniques. See C. L. Arthur, J. Pawliszyn, Solid phase microextraction with thermal desorption using fused silica optical fibers, Anal. Chem. 62 (1990) 2145-2148. doi:10.1021/ac00218a019; Y. He, H. K. Lee, Liquid-Phase Microextraction in a Single Drop of Organic Solvent by Using a Conventional Microsyringe, Anal. Chem. 69 (1997) 4634-4640. doi:10.1021/ac970242q; M. Rezaee, Y. Assadi, M.-R. Milani Hosseini, E. Aghaee, F. Ahmadi, S. Berijani, Determination of organic compounds in water using dispersive liquid-liquid microextraction., J. Chromatogr. A. 1116 (2006) 1-9. doi:10.1016/j.chroma.2006.03.007; and C. Basheer, A. A. Alnedhary, B. S. M. Rao, S. Valliyaveettil, H. K. Lee, Development and application of porous membrane-protected carbon nanotube micro-solid-phase extraction combined with gas chromatography/mass spectrometry., Anal. Chem. 78 (2006) 2853-8. doi:10.1021/ac060240i, each incorporated herein by reference in their entirety.

Despite all the major advancements in microextraction techniques, a kind of sample pretreatment or modification is generally required for samples characterized by a complex matrix composition. Moreover, some of these methods cannot extract directly from solid samples or complexed matrix samples. The cost and fragile qualities of the extraction devices, and instability against certain solvents, are among some major challenges. See A. Sarafraz-Yazdi, A. Amiri, Liquid-phase microextraction, TrAC Trends Anal. Chem. 29 (2010) 1-14. doi:10.1016/j.trac.2009.10.003, incorporated herein by reference in its entirety.

To deal with extraction of analytes from solid samples, the sorbent and solvent-based microextractions generally require the digestion or dissolution of the solid samples in water or any other solvent. Further pretreatment or dilution may be needed based on the nature of the sample and selected microextraction technique. In sorbent-based techniques, two main steps are involved; first is the adsorption of the analytes from the sample onto the sorbent, and second is the thermal or solvent desorption of the analytes from the sorbent.

Porous membrane protected micro-solid-phase extraction (μ-SPE) was first introduced by Basheer et al., in 2006 as an alternative to multistep SPE. See C. Basheer et al. In μ-SPE, a few milligrams of sorbent are packed inside a porous polymer membrane sheet which is heat sealed to fabricate a tea-bag like μ-SPE device. The μ-SPE device is then used for the adsorption of the analytes from the sample solution. The unique feature of μ-SPE is its direct use in complex samples as the sorbent is effectively protected inside the membrane bag, and interfering species cannot adsorb on it. That is why μ-SPE has been used for a wide variety of matrices. See M. Sajid, Porous membrane protected micro-solid-phase extraction: A review of features, advancements and applications, Anal. Chim. Acta. 965 (2017) 36-53. doi:10.1016/j.aca.2017.02.023, incorporated herein by reference in its entirety. After adsorption, analytes are back extracted into a suitable solvent. µ-SPE has been widely used for the extraction of analytes from environmental, food, and biological samples. See C. Basheer et al.; L. Xu, H. K. Lee, Novel approach to microwave-assisted extraction and micro-solid-phase extraction from soil using graphite fibers as sorbent., J. Chromatogr. A. 1192 (2008) 203-7. doi:10.1016/j.chroma.2008.03.060; L. Guo, H. K. Lee, Development of multiwalled carbon nanotubes based micro-solid-phase extraction for the determination of trace levels of sixteen polycyclic aromatic hydrocarbons in environmental water samples., J. Chromatogr. A. 1218 (2011) 9321-7. doi: 10.1016/j.chroma.2011.10.066; D. Ge, H. K. Lee, Water stability of zeolite imidazolate framework 8 and application to porous membrane-protected micro-solid-phase extraction of polycyclic aromatic hydrocarbons from environmental water samples., J. Chromatogr. A. 1218 (2011) 8490-5. doi:10.1016/j.chroma.2011.09.077; D. Ge, H. K. Lee, Zeolite imidazolate frameworks 8 as sorbent and its application to sonication-assisted emulsification microextraction combined with vortex-assisted porous membrane-protected micro-solid-phase extraction for fast analysis of acidic drugs in environmental w, J. Chromatogr. A. 1257 (2012) 19-24. doi:10.1016/j.chroma.2012.08.032; D. Ge, H. K. Lee, Sonication-assisted emulsification microextraction combined with vortex-assisted porous membrane-protected micro-solid-phase extraction using mixed zeolitic imidazolate frameworks 8 as sorbent., J. Chromatogr. A. 1263 (2012) 1-6. doi:10.1016/j.chroma.2012.09.016; H. Zhang, W. P. Low, H. K. Lee, Evaluation of sulfonated graphene sheets as sorbent for micro-solid-phase extraction combined with gas chromatography-mass spectrometry., J. Chromatogr. A. 1233 (2012) 16-21. doi:10.1016/j.chroma.2012.02.020; Y. Wang, S. Jin, Q. Wang, G. Lu, J. Jiang, D. Zhu, Zeolitic imidazolate framework-8 as sorbent of micro-solid-phase extraction to determine estrogens in environmental water samples., J. Chromatogr. A. 1291 (2013) 27-32. doi: 10.1016/j.chroma.2013.03.032; N. N. Naing, S. F. Y. Li, H. K. Lee, Evaluation of graphene-based sorbent in the determination of polar environmental contaminants in water by micro-solid phase extraction-high performance liquid chromatography., J. Chromatogr. A. 1427 (2016) 29-36. doi: 10.1016/j.chroma.2015.12.012; C. Basheer, A. A. Alnedhary, B. S. M. Rao, H. K. Lee, Determination of carbamate pesticides using micro-solid-phase extraction combined with high-performance liquid chromatography., J. Chromatogr. A. 1216 (2009) 211-6. doi: 10.1016/j.chroma.2008.11.042; C. Basheer, S. Pavagadhi, H. Yu, R. Balasubramanian, H. K. Lee, Determination of aldehydes in rainwater using micro-solid-phase extraction and high-performance liquid chromatography., J. Chromatogr. A. 1217 (2010) 6366-72. doi:10.1016/j.chroma.2010.08.012; Z. Huang, H. K. Lee, Micro-solid-phase extraction of organochlorine pesticides using porous metal-organic framework MIL-101 as sorbent., J. Chromatogr. A. 1401 (2015) 9-16. doi:10.1016/j.chroma.2015.04.052; Q. Feng, L. Zhao, J.-M. Lin, Molecularly imprinted polymer as micro-solid phase extraction combined with high performance liquid chromatography to determine phenolic compounds in environmental water samples., Anal. Chim. Acta. 650 (2009) 70-6; doi:10.1016/j.aca.2009.04.016; L. Guo, H. K. Lee, Vortex-assisted micro-solid-phase extraction followed by low-density solvent based dispersive liquid-liquid microextraction for the fast and efficient determination of phthalate esters in river water samples., J. Chromatogr. A. 1300 (2013) 24-30. doi:10.1016/j.chroma.2013.01.030; Z. Jiao, Z. Guo, S. Zhang, H. Chen, H. Xie, S. Zeng, Novel Extraction for Endocrine Disruptors in Atmospheric Particulate Matter, Anal. Lett. 48 (2015) 1355-1366. doi:10.1080/00032719.2014.981821; T. Wang, J. Wang, C. Zhang, Z. Yang, X. Dai, M. Cheng, X. Hou, Metal-organic framework MIL-101(Cr) as a sorbent of porous membrane-protected micro-solid-phase extraction for the analysis of six phthalate esters from drinking water: a combination of experimental and computational study., Analyst. 140 (2015) 5308-16. doi:10.1039/c5an00553a; Z. Jiao, Z. Guo, S. Zhang, H. Chen, Microwave-assisted micro-solid-phase extraction for analysis of tetracycline antibiotics in environmental samples, Int. J. Environ. Anal. Chem. 95 (2015) 82-91. http://www.tandfonline.com/doi/full/10.1080/03067319.2014.983497 (accessed Dec. 27, 2015); C. Basheer, H. G. Chong, T. M. Hii, H. K. Lee, Application of porous membrane-protected micro-solid-phase extraction combined with HPLC for the analysis of acidic drugs in wastewater., Anal. Chem. 79 (2007) 6845-50. doi:10.1021/ac070372r; H. L. Teo, L. Wong, Q. Liu, T. L. Teo, T. K. Lee, H. K. Lee, Simple and accurate measurement of carbamazepine in surface water by use of porous membrane-protected micro-solid-phase extraction coupled with isotope dilution mass spectrometry., Anal. Chim. Acta. 912 (2016) 49-57. doi:10.1016/j.aca.2016.01.028; Y.-Y. Zhou, C.-Y. Zhang, Z.-G. Yan, K.-J. Li, L. Wang, Y.-B. Xie, F.-S. Li, Z. Liu, J. Yang, The use of copper(II) isonicotinate-based micro-solid-phase extraction for the analysis of polybrominated diphenyl ethers in soils., Anal. Chim. Acta. 747 (2012) 36-41. doi:10.1016/j.aca.2012.08.023; K. M. Ara, S. Pandidan, A. Aliakbari, F. Raofie, M. M. Amini, Porous-membrane-protected polyaniline-coated SBA-15 nanocomposite micro-solid-phase extraction followed by high-performance liquid chromatography for the determination of parabens in cosmetic products and wastewater., J. Sep. Sci. 38 (2015) 1213-24. doi:10.1002/jssc.201400896; N. N. Naing, S. F. Y. Li, H. K. Lee, Application of porous membrane-protected chitosan microspheres to determine benzene, toluene, ethylbenzene, xylenes and styrene in water, J. Chromatogr. A. 1448 (2016) 42-48. doi:10.1016/j.chroma.2016.04.062; T. P. Lee, B. Saad, W. S. Khayoon, B. Salleh, Molecularly imprinted polymer as sorbent in micro-solid phase extraction of ochratoxin A in coffee, grape juice and urine., Talanta. 88 (2012) 129-35. doi:10.1016/j.talanta.2011.10.021; T. P. Lee, B. Saad, E. P. Ng, B. Salleh, Zeolite Linde Type L as micro-solid phase extraction sorbent for the high performance liquid chromatography determination of ochratoxin A in coffee and cereal., J. Chromatogr. A. 1237 (2012) 46-54. doi:10.1016/j.chroma.2012.03.031; J. Huang, J. Liu, C. Zhang, J. Wei, L. Mei, S. Yu, G. Li, L. Xu, Determination of sulfonamides in food samples by membrane-protected micro-solid phase extraction coupled with high performance liquid chromatography., J. Chromatogr. A. 1219 (2012) 66-74. doi:10.1016/j.chroma.2011.11.026; Z. Jiao, D. Zhu, W. Yao, Combination of Accelerated Solvent Extraction and Micro-Solid-Phase Extraction for Determination of Trace Antibiotics in Food Samples, Food Anal. Methods. 8 (2015) 2163-2168. doi:10.1007/s12161-015-0105-y; Z. Wang, X. Zhao, X. Xu, L. Wu, R. Su, Y. Zhao, C. Jiang, H. Zhang, Q. Ma, C. Lu, D. Dong, An absorbing microwave micro-solid-phase extraction device used in nonpolar solvent microwave-assisted extraction for the determination of organophosphorus pesticides., Anal. Chim. Acta. 760 (2013) 60-8. doi:10.1016/j.aca.2012.11.031; L. Wang, X. Zang, C. Wang, Z. Wang, Graphene oxide as a micro-solid-phase extraction sorbent for the enrichment of parabens from water and vinegar samples., J. Sep. Sci. 37 (2014) 1656-62. doi:10.1002/jssc.201400028; C. Basheer, W. Wong, A. Makahleh, A. A. Tameem, A. Salhin, B. Saad, H. K. Lee, Hydrazone-based ligands for micro-solid phase extraction-high performance liquid chromatographic determination of biogenic amines in orange juice., J. Chromatogr. A. 1218 (2011) 4332-9. doi:10.1016/j.chroma.2011.04.073; M. Sajid, C. Basheer, A. Alsharaa, K. Narasimhan, A. Buhmeida, M. Al Qahtani, M. S. Al-Ahwal, Development of natural sorbent based micro-solid-phase extraction for determination of phthalate esters in milk samples, Anal. Chim. Acta. 924 (2016) 35-44. doi:10.1016/j.aca.2016.04.016; S. Kanimozhi, C. Basheer, K. Narasimhan, L. Liu, S. Koh, F. Xue, M. Choolani, H. K. Lee, Application of porous membrane protected micro-solid-phase-extraction combined with gas chromatography-mass spectrometry for the determination of estrogens in ovarian cyst fluid samples, Anal. Chim. Acta. 687 (2011) 56-60. doi:10.1016/j.aca.2010.12.007; M. Sajid, C. Basheer, K. Narasimhan, A. Buhmeida, A. Qahtani, M. S. Al-ahwal, Persistent and Endocrine Disrupting Organic Pollutants: Advancements and Challenges in Analysis, Health Concerns and Clinical Correlates, Nat. Environ. Pollut. Technol. 15 (2016) 733-746; C. Basheer, K. Narasimhan, M. Yin, C. Zhao, M. Choolani, H. K. Lee, Application of micro-solid-phase extraction for the determination of persistent organic pollutants in tissue samples, J. Chromatogr. A. 1186 (2008) 358-364. doi:10.1016/j.chroma.2007.10.015; M. Sajid, C. Basheer, K. Narasimhan, M. Choolani, H. K. Lee, Application of microwave-assisted micro-solid-phase extraction for determination of parabens in human ovarian cancer tissues, J. Chromatogr. B Anal. Technol. Biomed. Life Sci. 1000 (2015) 192-198. doi:10.1016/j.jchromb.2015.07.020; M. Sajid, C. Basheer, M. Mansha, Membrane protected micro-solid-phase extraction of organochlorine pesticides in milk samples using zinc oxide incorporated carbon foam as sorbent, J. Chromatogr. A. 1475 (2016) 110-115. doi: 10.1016/j.chroma.2016.11.008; M. Sajid, C. Basheer, M. Daud, A. Alsharaa, Evaluation of layered double hydroxide/graphene hybrid as a sorbent in membrane-protected stir-bar supported micro-solid-phase extraction for determination of organochlorine pesticides in urine samples, J. Chromatogr. A. 1489 (2017) 1-8; doi:10.1016/j.chroma.2017.01.089; J. Sánchez-González, M. J. Tabernero, A. M. Bermejo, P. Bermejo-Barrera, A. Moreda-Piñeiro, Porous membrane-protected molecularly imprinted polymer micro-solid-phase extraction for analysis of urinary cocaine and its metabolites using liquid chromatography—Tandem mass spectrometry., Anal. Chim. Acta. 898 (2015) 50-9. doi:10.1016/j.aca.2015.10.002; J. Sánchez-González, S. Garciá-Carballal, P. Cabarcos, M. J. Tabernero, P. Bermejo-Barrera, A. Moreda-Piñeiro, Determination of cocaine and its metabolites in plasma by porous membrane-protected molecularly imprinted polymer micro-solid-phase extraction and liquid chromatography-tandem mass spectrometry, J. Chromatogr. A. 1451 (2016) 15-22. doi:10.1016/j.chroma.2016.05.003; J. Sánchez-González, R. Salgueiro-Fernández, P. Cabarcos, A. M. Bermejo, P. Bermejo-Barrera, A. Moreda-Piñeiro, Cannabinoids assessment in plasma and urine by high performance liquid chromatography-tandem mass spectrometry after molecularly imprinted polymer microsolid-phase extraction, Anal. Bioanal. Chem. 409 (2017) 1207-1220. doi:10.1007/s00216-016-0046-3; X.-Y. Yin, Y.-M. Luo, J.-J. Fu, Y.-Q. Zhong, Q.-S. Liu, Determination of hyperoside and isoquercitrin in rat plasma by membrane-protected micro-solid-phase extraction with high-performance liquid chromatography., J. Sep. Sci. 35 (2012) 384-91. doi: 10.1002/jssc.201100867; and M. Lashgari, H. K. Lee, Micro-solid phase extraction of perfluorinated carboxylic acids from human plasma., J. Chromatogr. A. 1432 (2016) 7-16. doi: 10.1016/j.chroma.2016.01.005, each incorporated herein by reference in their entirety.

However, µ-SPE cannot extract directly from a solid sample, as the solid sample needs to be digested or dissolved in a liquid. See S. Kanimozhi et al.; M. Sajid et al.; and Z. Jiao et al.

In view of the forgoing, one objective of the present invention is the direct extraction from a solid sample into a suitable solvent. Instead of packing the sorbent inside the porous membrane bag, packing the solid sample inside the bag is described herein. The analytes are extracted by immersing the bag containing the solid sample inside the suitable solvent through the aid of the ultra-sonication. This approach eliminates the step of adsorption as analytes are directly extracted into the solvent. Moreover, no sample cleanup is needed, because the interfering species such as macromolecules, fats, proteins etc. (in case of biological solid samples) cannot come out of the porous membrane. This technique results in a clear extract that can be directly injected into an analytical instrument. In this work, polycyclic aromatic hydrocarbons (PAHs) were extracted from soil samples, and the technique may be extended to a variety of analytes present in other various solid samples.

BRIEF SUMMARY OF THE INVENTION

According to a first aspect, the present disclosure relates to a method for extracting an analyte from a solid sample. This method involves sonicating the solid sample and an organic solvent in a vial. The vial comprises a porous membrane bag contained within the vial, and the porous membrane bag encapsulates the solid sample. The porous membrane bag has an average pore size in a range of 50-150 nm. The method also involves extracting the analyte from the solid sample to produce an extract within the organic solvent. Throughout this process the porous membrane bag and the vial do not contain a solid sorbent.

In one embodiment, the analyte is a polycyclic aromatic hydrocarbon.

In one embodiment, the analyte is at least one polycyclic aromatic hydrocarbon selected from the group consisting of acenaphthene, acenaphthylene, anthracene, benz[a]anthracene, benzo[b]fluoranthene, benzo[ghi]perylene, benzo[a]pyrene, 2-bromonaphthalene, chrysene, dibenz[ah]anthracene, fluoranthene, fluorene, indeno[1,2,3-cd]pyrene, naphthalene, phenanthrene, and pyrene.

In a further embodiment, where the analyte is a polycyclic aromatic hydrocarbon, a matrix effect of the solid sample is in a range of 85-115%.

In one embodiment, the organic solvent is at least one selected from the group consisting of acetone, benzene, cyclohexane, n-hexane, toluene, iso-octane, heptane, dichloromethane, and decane.

In a further embodiment, the embodiment, the organic solvent is n-hexane.

In one embodiment, the porous membrane bag comprises at least one polymer selected from the group consisting of polypropylene, polyethylene, nylon, polyvinylidene fluoride, and polyethersulfone.

In one embodiment, the porous membrane bag consists of polypropylene.

In one embodiment, the porous membrane bag comprises a porous membrane having an average thickness in a range of 10-200 µm.

In one embodiment, the solid sample comprises a soil or a decayed vegetation/plant matter.

In one embodiment, 1.0-5.0 mg of the solid sample is present per mL organic solvent.

In one embodiment, 0.5-500 mg of the solid sample is present per $cm^2$ exterior surface area of the porous membrane bag.

In one embodiment, the solid sample is not reacted or digested prior to the sonicating.

In one embodiment, the solid sample and organic solvent are sonicated for 20-30 min at a power of 40-80. In one embodiment, a temperature of the organic solvent does not exceed 50° C.

In one embodiment, the sonicating is performed with a bath sonicator.

In one embodiment, the sonicating simultaneously digests the sample and extracts the analyte.

In one embodiment, the analyte is detected and/or quantified in a range of 0.5-400 ng per mg solid sample.

In one embodiment, the method has an analyte recovery of at least 90%.

In one embodiment, the method further comprises drying the extract to produce a dried extract. The dried extract is resuspended in a second volume of the organic solvent to produce a concentrated extract solution. The concentrated extract solution is directly injected into a mass spectrometer or a chromatography column. In the method, no filtering step and/or centrifuging step is used on the organic solvent, extract, or concentrated extract solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
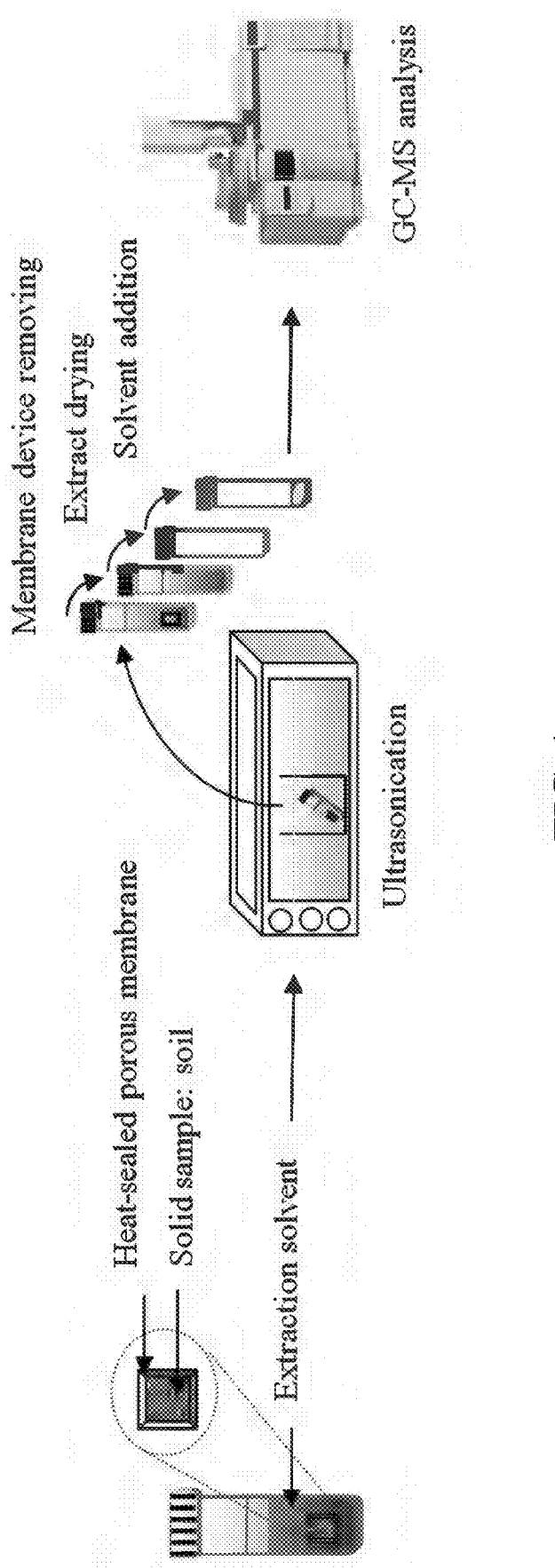
FIG. 1 is a schematic representation of the developed analytical procedure for polycyclic aromatic hydrocarbon (PAH) determination in soil samples.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method for extracting an analyte from a solid sample. This method involves sonicating the solid sample and an organic solvent in a vial. The vial comprises a porous membrane bag contained within the vial, and the porous membrane bag encapsulates the solid sample. The porous membrane bag has an average pore size in a range of 50-150 nm. The method also involves extracting the analyte from the solid sample to produce an extract within the organic solvent. Throughout this process the porous membrane bag and the vial do not contain a solid sorbent.

In one embodiment, the analyte is a polycyclic aromatic hydrocarbon (PAH). PAHs, (also "polyaromatic hydrocarbons" or "polynuclear aromatic hydrocarbons") are hydrocarbons-organic compounds containing only carbon and hydrogen—that are composed of multiple aromatic rings (organic rings in which the electrons are delocalized). The simplest such chemicals are naphthalene, having two aromatic rings, and the three-ring compounds anthracene and phenanthrene. PAHs with five or six-membered rings are most common. Those composed only of six-membered rings are called alternate PAHs, which include benzenoid PAHs. PAHs are nonpolar and lipophilic. Larger PAHs are generally insoluble in water, although some smaller PAHs are soluble and known contaminants in drinking water.

In one embodiment, the PAH may be one chosen from the group consisting of acenaphthene, acenaphthylene, acephenanthrylene, acridine, anthanthrene, anthracene, 9,10-anthracenedione, 9(10H)-anthracenone, anthraquinone, anthrone, benz[e]acephenanthrylene, benz[c]acridine, benz[a]anthracene, 7H-benz[de]anthracen-7-one, benzanthrone, benzo[b]chrysene, benzo[c]chrysene, benzo[g]chrysene, benzo[c]cinnoline, benzo[a]dibenzothiophene, benzo[b]fluoranthene, benzo[ghi]fluoranthene, benzo[j]fluoranthene, benzo[k]fluoranthene, 11H-benzo[a]fluorene, 11H-benzo[b]fluorene, 7H-benzo[c]fluorene, benzo[h]naphtho[1,2-f]quinolene, benzo[b]naphtho[2,1-d]thiophene, benzo[rst]pentaphene, benzo[ghi]perylene, benzo[c]phenanthrene, benzo[a]pyrene, benzo[e]pyrene, benzo[f]quinoline, benzo[h]quinoline, benzo[b]triphenylene, biphenylene, 2-bromonaphthalene, 9H-carbazole, chrysene, coronene, 4H-cyclopenta[def]phenanthrene, cyclopenta[cd]pyrene, dibenz[a,h]acridine, dibenz[a,j]acridine, dibenz[c,h]acridine, dibenz[a,c]anthracene, dibenz[a,h]anthracene, dibenz[a,j]anthracene, 7H-dibenzo[a,g]carbazole, 13H-dibenzo[a,i]carbazole, 7H-dibenzo[c,g]carbazole, dibenzo[b,def]chrysene, dibenzo[def,mno]chrysene, dibenzo[def,p]chrysene, dibenzo[b,h]phenanthrene, dibenzo[a,e]pyrene, dibenzo[a,h]pyrene, dibenzo[a,i]pyrene, dibenzo[a,l]pyrene, dibenzothiophene, fluoranthene, fluorene, 9H-fluorene, 9H-fluoren-9-one, indeno[1,2,3-cd]pyrene, 1H-indole, isoquinoline, naphthacene, naphthalene, naphtho[1,2,3,4-def]chrysene, naphtho[2,3-f]quinoline, pentacene, perylene, 1H-phenalene, phenanthraquinone, phenanthrene, 9,10-phenanthrenedione, phenanthridine, 1,10-phenanthroline, phenanthro[4,5-bcd]thiophene, phenazine, phenazone, picene, pyrene, quinoline, triphenylene, and 9H-xanthene.

Preferably the PAH is acenaphthene, acenaphthylene, anthracene, benz[a]anthracene, benzo[b]fluoranthene, benzo[ghi]perylene, benzo[a]pyrene, 2-bromonaphthalene, chrysene, dibenz[a,h]anthracene, fluoranthene, fluorene, indeno[1,2,3-cd]pyrene, naphthalene, phenanthrene, or pyrene. More preferably the PAH is benz[a]anthracene or benzo[a]pyrene.

PAHs may be a form of pollution. PAHs typically disperse from urban and suburban non-point sources through road run-off, sewage, and atmospheric circulation and subsequent deposition of particulate air pollution. Soil and river sediment near industrial sites such as creosote manufacturing facilities can be highly contaminated with PAHs. Oil spills, creosote, coal mining dust, and other fossil fuel sources can also distribute PAHs in the environment.

Two- and three-ringed PAHs can disperse widely while dissolved in water or as gases in the atmosphere, while PAHs with higher molecular weights can disperse locally or regionally adhered to particulate matter that is suspended in air or water until the particles land or settle out of the water column. PAHs have a strong affinity for organic carbon, and thus sediments in rivers, lakes, and the ocean, which may comprise a high amount of organic compounds can be a substantial sink for PAHs.

In alternative embodiments, the method may be used to study other analytes and pollutants that are not PAH. These analytes may be contaminants such as trihalomethanes, haloketones, haloether, N-nitrosamine, and/or haloacetic acids. In another embodiment, the analyte may be a degradation byproduct of PAH, such as nitrogenated, halogenated, hydroxylated, and oxygenated PAHs, which in some cases may be more toxic than their parent PAHs.

In one embodiment, the solid sample comprises a soil or a decayed plant matter/vegetation. In other words, the solid sample may be considered "earth," and may be considered a sample of the pedosphere. Soil is a mixture of organic matter, minerals, gases, liquids, and organisms that together support life. Earth's body of soil is the pedosphere, which has four important functions: it is a medium for plant growth; it is a means of water storage, supply and purification; it is a modifier of Earth's atmosphere; and it is a habitat for organisms; all of which, in turn, modify the soil. The pedosphere is the outermost layer of the Earth that is composed of soil and subject to soil formation processes. It exists at the interface of the lithosphere, atmosphere, hydrosphere, and biosphere. The pedosphere is the skin of the Earth and only develops when there is a dynamic interaction between the atmosphere (air in and above the soil), biosphere (living organisms), lithosphere (unconsolidated regolith and consolidated bedrock) and the hydrosphere (water in, on and below the soil). The pedosphere is the foundation of terrestrial life on Earth.

The pedosphere acts as the mediator of chemical and biogeochemical flux into and out of these respective systems and is made up of gaseous, mineral, fluid, and biologic components. The pedosphere lies below the vegetative cover of the biosphere and above the hydrosphere and lithosphere. The soil forming process (pedogenesis) can begin without the aid of biology but is significantly quickened in the presence of biologic reactions. Soil formation begins with the chemical and/or physical breakdown of minerals to form the initial material that overlies the bedrock substrate. Biology quickens this by secreting acidic compounds (dominantly fulvic acids) that help break rock apart. Particular biologic pioneers are lichens, mosses, and seed-bearing plants, but many other inorganic reactions take place that diversify the chemical makeup of the early soil layer. Once weathering and decomposition products accumulate, a coherent soil body allows the migration of fluids both vertically and laterally through the soil profile, causing ion exchange between solid, fluid and gaseous phases. As time progresses, the bulk geochemistry of the soil layer will deviate away from the initial composition of the bedrock and will evolve to a chemistry that reflects the type of reactions that take place in the soil. In one embodiment, the soil sample may be taken from the organic surface layer, the surface soil, the subsoil, or the substratum. The soil sample may be taken from the surface, or at a depth of 3-100 cm, preferably 4-20 cm below the surface.

As described here, the solid sample comprising a decayed plant matter (or decayed vegetation) is intended to include peat. Peat forms when plant material does not fully decay in acidic and anaerobic conditions. It is composed mainly of wetland vegetation: principally bog plants including mosses, sedges, and shrubs, and is found in areas called peatlands, bogs, mires, moors, or muskegs. In one embodiment, the decayed plant matter may be considered compost or humus.

As mentioned previously, the solid sample is enclosed within a porous membrane bag. The porous membrane bag permits the perfusion of organic solvent and extract/analyte, while confining solids and interferences within the porous membrane bag. Where the solid sample is soil or decayed vegetation, interferences may be solids, mineral complexes, proteins, biomolecules, fiber, humic acid, and/or microorganisms. In one embodiment, the porous membrane bag comprises at least one polymer selected from the group consisting of polypropylene, polyethylene, nylon, polyvinylidene fluoride, and polyethersulfone. In a further embodiment, the porous membrane bag may comprise, consist essentially of, or consist of polypropylene (PP), though other synthetic membranes with similar thickness and porosity may be used. Polypropylene may be a homopolymer or a copolymer, such as a block copolymer or random copolymer. Conveniently, a commercially available polypropylene may be used. In an alternative embodiment, more than one polymer may comprise the porous membrane. For example, the porous membrane may be composed of both polypropylene and polyethylene with a polypropylene to polyethylene weight ratio range of 1:10-10:1, preferably 1:5-5:1, more preferably 1:2-2:1.

In one embodiment, the porous membrane bag comprises a porous membrane having an average thickness that may range from 50, 60, 70, 80, 90, 100, 110, 120, 130, 140, 150, 160, 170, 180, 190, 200 or >200 µm, preferably 10-200 µm, 50-150 µm, or 80-120 µm. The porous membrane may have an average pore size ranging from 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24 or 0.25 µm, preferably the average pore size is in a range of 50-150 nm, 60-140 nm, 70-130, 80-120 nm, 90-110 nm, or about 100 nm. In some embodiments, the average pore size in the porous membrane will be greater than or equal to 0.05, 0.06, 0.07, 0.08, 0.09 or 0.10 µm and the average thickness will not exceed 100 µm.

In one embodiment, the porous membrane forming the porous membrane bag has a uniform thickness of about 100 µm and a pore size of about 1.0 µm. In some embodiments, a polypropylene bag may be replaced by a porous bag made of a different kind of plastic or semipermeable membrane. Preferably the porous membrane has a uniform thickness and pore size that does not vary by more than 0.1, 0.2, 0.5, 1, 2, 3, 4, 5, 6, 7, 8, 9, or 10% over a surface of the porous membrane exposed to the organic solvent. Unlike conventional membranes which do not have uniform thickness or porosity, the use of a porous membrane with uniform properties may provide a more accurate and precise analyte extraction from solid samples.

A weight ratio of the solid sample to the porous membrane bag may be in a range of 0.01:1-0.70:1, preferably 0.05:1-0.50:1, more preferably 0.10:1-0.30:1, even more preferably 0.10:1-0.20:1, or about 0.125:1. However, in some embodiments, a weight ratio of the solid sample to the porous membrane bag may be lower than 0.01:1 or greater than 0.70:1. In some embodiments, the weight of the solid sample may be similar to or greater than the weight of the porous membrane bag.

In one embodiment, the porous membrane itself will be a single layer and the porous membrane bag will not incorporate or contain a solid sorbent or an adsorbent. Examples of solid sorbents include, but are not limited to, silica gel, activated carbon, fly ash, diatomaceous earth, alumina ($Al_2O_3$), magnesium oxide (MgO), titanium oxide ($TiO_2$), and polymer sorbents. In a further embodiment, the porous membrane bag and the vial do not contain a solid sorbent (the porous membrane bag is not a sorbent for the purposes of the present disclosure). However, in an alternative embodiment, the porous membrane bag may incorporate an adsorbent such as a polymeric matrix containing carbon nanotubes. In this alternative embodiment, it is not necessary for the porous membrane to contain a second layer such as a backing or support layer or a film or applied coating. Such a porous membrane when configured as an enclosure for a solid sample will typically contain a loose or packed adsorbent that is separate and not attached to the porous membrane. However, in some alternative embodiments, an adsorbent may be bound to or coated on the porous membrane.

The porous membrane bag may be formed by a single layer of the membrane without additional membranous layers, coatings, films, filtration assemblies, holders, or other external components since a single layer of the porous membrane provides for more rapid and complete perfusion of the organic solvent and extract. Thus, for use, it may be unnecessary to insert the membrane bag into a frame, carrier, filter cartridge assembly, or other mechanical device to affix a filter. However, in some alternative embodiments, two, three, or more layers of porous membrane or may be used to form a membrane bag or the porous membrane bag may be incorporated as part of a larger system comprising other elements such as filters, holders, or other external components.

In one embodiment, the porous membrane bag has a shape that is triangular, tetrahedral, square, cubic, rectangular, parallelepiped, circular, spherical, pouch-like, sachet-like, purse-like, or other shape that prevents release of the solid sample and interferences from the porous membrane bag. In some embodiments, two or more porous membranes are sealed together to produce the porous membrane bag, for example, two rectangular or square-shaped porous membranes may have a solid sample placed between their surfaces and then sealed to produce a membrane bag. In another embodiment, two circular or oval-shaped membranes may be loaded with the solid sample and sealed to product a circular or oval-shaped pod. In other embodiments, only a single membrane will be used to produce a porous membrane bag enclosing the solid sample. Typically the porous membrane bag permanently seals in the solid sample so as to prevent its accidental escape into the bulk of the organic solvent.

In some embodiments, the membrane bag comprises pleats or folds that permit the membrane bag to open or expand after contact with the organic solvent, or when holding a sample, thus exposing more of the membrane surface to the organic solvent to be treated. A porous membrane bag may additionally include a seal and a string, thread, or grip to permit it to be dropped into a liquid and then removed. The seal may be a string that secures the contents of the membrane bag at one end by a knot, such as a fiber knot to help shape the bag, or other attachment where the appendage is long enough to permit dipping, swirling, lifting, or other movement of the porous membrane bag in an organic solvent and for removal of the membrane bag from the vial after the sonication. A top or distal end of the string, thread or grip, may be attached to a tab which may be colored coded or labelled to permit easy handling and identification of the membrane bag and solid sample. The string, thread, or grip may be about 4, 5, 6, 7, 8, 9, 10, 11, or 12 cm long, or may be longer or shorter depending on the shape of the vial. The string, thread or grip may be made of cotton or another natural fiber, a synthetic fiber such as nylon, or a blend of natural and synthetic fibers which may be woven.

In related embodiments, the porous membrane bag may comprise a membrane in the shape of a tube, for example, a hollow fiber membrane, where the ends of the tube are closed in order to contain the solid sample. The edges may be closed by an adhesive, a clamp, a tie, or by heat sealing. Alternatively, the membrane may form a balloon shape around the solid sample, with the membrane closed at one side, or with the membrane edges tied at one point. Alternatively, the membrane bag may form a rectangular pillow shape around the solid sample. In other embodiments, the edges or perimeter of the membrane may be sealed with an adhesive or folded and mechanically sealed, for example with stitching or stapling. In this embodiment, the four edges may be sealed along each edge, or one edge may be a fold in the membrane with the remaining edges being sealed along each edge. In this pillow shape, the edges may measure 0.4-2 cm, preferably 0.6-1.5 cm, more preferably 0.7-1 cm in length, and the height may be 0.4-2 cm, preferably 0.6-1.5 cm, more preferably 0.7-1 cm. In one embodiment, the length may be about 0.8 cm, and the height may be about 0.8 cm. However, in some embodiments, one or more edges may be less than 0.4 cm or greater than 2 cm.

The porous membrane bag may hold a maximum volume of 0.05-5 $cm^3$, preferably 0.1-1 $cm^3$, more preferably 0.25-0.75 $cm^3$ of a sample. In one embodiment, 0.5-500 mg of the solid sample is present per $cm^2$ exterior surface area of the porous membrane bag. In other embodiments, preferably 0.7-100 mg, more preferably 1.0-50 mg, more preferably 1.5-5 mg of the solid sample is present per $cm^2$ exterior surface area of the porous membrane bag. In one embodiment, about 2 mg of the solid sample is present per $cm^2$ exterior surface area. Preferably, of the exterior surface area of the porous membrane bag, at least 80%, preferably at least 90%, more preferably at least 97%, even more preferably about 100% of the is in contact with the organic solvent.

The membrane bag may enclose both the solid sample and a gas. The gas may be present as a bubble or bubbles, and may comprise air, vaporized organic solvent, or some other compound. The gas may result from the infusion of organic solvent combined with the heating from the sonication. A gas in the membrane bag may comprise 0-50 vol %, preferably 0-10 vol %, more preferably 0-1 vol % of the total enclosed volume of the membrane bag.

As mentioned previously, an organic solvent is used for the extraction process. In one embodiment, the organic solvent is at least one selected from the group consisting of acetone, benzene, cyclohexane, n-hexane, toluene, iso-octane, heptane, dichloromethane, and decane. Preferably the organic solvent is n-hexane.

The organic solvent is contained within the vial, and is able to perfuse into the porous membrane bag and contact the solid sample. In one embodiment, 0.1-5.0 mg of the solid sample, preferably 0.4-4.0 mg, more preferably 0.5-2.0 mg is present per mL organic solvent. However, in some embodiments, less than 0.1 mg or greater than 5.0 mg of the solid sample may be present per mL organic solvent. As described herein, "organic solvent," and references to the organic solvent, such as its volume, without further description, is intended to refer to the total volume of organic solvent within the vial, which includes organic solvent both inside and outside of the porous membrane bag. Preferably the vial has a fluid-tight cap, in order to contain both liquids and vapors within the vial during the sonicating. However, in alternative embodiments, the vial may be open to atmospheric pressure but topped by a vapor condenser. In one embodiment, the weight of the solid sample relative to the volume of the vial may be 0.1-5.0 mg/mL, preferably 0.2-4.0 mg/mL, more preferably 0.3-2.0 mg/mL. The vial, when capped and containing the solid sample, porous membrane bag, and organic solvent, may have a headspace of less than 40 vol %, preferably less than 20 vol %, more preferably less than 10 vol %, relative to a total interior (enclosed) volume of the capped vial.

In one embodiment, method comprises sonicating the vial containing the organic solvent, the porous membrane bag, and the solid sample using a sonicator. In this embodiment, the extraction time may be considered the duration of the sonication. Here, the solid sample, organic solvent, porous membrane bag, and vial are sonicated for a period of 5-60 min, preferably 10-50 min, more preferably 15-40 min, 20-30 min, 21-29 min, 22-27 min, even more preferably about 25 min. The sonicating may be continuous, pulsed, or modulated in some way. Preferably the sonicating is continuous. The sonicator used may be a probe sonicator inserted into the mixture, or, more preferably, a bath sonicator that can sonicate a plurality of samples without a direct contact between the sonicator and the samples. Without such a direct contact, the chance of cross-contamination is reduced, and cleaning of the sonicator between different samples is not needed. The sonicating frequency is about 20-120 kHz, about 40-100 kHz, or about 60-90 kHz, and may be considered "ultrasonication." However, in an alternative embodiment, a sonicator may create vibrations at a lower frequency than ultrasonic, for example, sonic vibrations, which may be used for the same purpose. The sonicating power may be 20-100 W, preferably 40-80 W, 45-75 W, more preferably 50-70 W, even more preferably 55-65 W, or about 60 W.

In one embodiment of the method, the extraction of the analyte occurs at the same time as sonicating, which means that the entire extraction method occurs in a single operation. For example, an analyte may be extracted from a solid sample and into the organic solvent in the membrane bag, which may then diffuse to the organic solvent outside of the membrane bag, without requiring a researcher to perform those extraction steps separately or subsequently. In addition, in the embodiment where the solid sample comprises a soil or a decayed vegetation or plant matter, the digestion of the sample is also contained within the extraction operation, meaning that a separate preparation step such as reacting the solid sample with a chemical reagent is not required. Additionally, in this embodiment, parts of the analyte may be simultaneously partitioned to three locations within the vial: in the solid sample within the porous membrane bag, within the organic solvent within the porous membrane bag, and within the organic solvent outside the porous membrane bag but within the vial. In addition, analyte may be present in the headspace of the vial as a vapor. In another embodiment, the analyte may be limited to different locations in the vial throughout the method. For example, at the beginning of the sonicating, the analyte may exist only in the solid sample and within the membrane bag. With prolonged sonicating, analyte may exist in all four places as previously described. Likewise, an internal standard may simultaneously exist in three or all four locations within the vial, or may be limited to one or two locations. In one embodiment, an internal standard may be mixed with the solid sample. In other embodiments, an internal standard may be added to the organic solvent outside of or within the porous membrane bag.

In one embodiment, the contents within the vial may additionally be agitated by shaking, tilting, or vortexing the vial, or by stirring the organic solvent with a stir bar, a stirring rod, or an impeller. This agitating may come before, during, and/or after the sonicating. In one embodiment, the agitating during or after the sonicating may enable faster diffusion of the analyte through the porous membrane bag.

In one embodiment, the porous membrane bag and organic solvent may be stirred with a stir bar. The stir bar may be stirred at a rate of 30-1000 rpm, preferably 60-700 rpm, more preferably 100-500 rpm. In another embodiment, the additional agitation may not be necessary as the analyte diffusion through the porous membrane bag is already increased due to the sonicating.

The amount of analyte or internal standard in the phases of the sample, solution, vapor, and liquid-phase extraction medium may depend on initial concentrations, the amount and rate of heating and agitating, and the partition coefficient of the analyte or internal standard among the different phases. Where two or more analytes are present, their relative concentrations may vary across different phases. Likewise, where one or more internal standards are present, the relative concentrations between an internal standard and an analyte, or between two internal standards, may also vary across different phases.

In one embodiment, the sonicating simultaneously digests the solid sample and extracts the analyte, as has been previously described. In other embodiments, the sonicating results in at least 60%, preferably at least 70%, more preferably at least 80%, more preferably at least 90%, more preferably at least 92%, even more preferably at least 95%, or at least 99%, of the one or more analytes being recovered by the organic solvent from the solid sample. In other words, the inventive method has an analyte recovery of those percentages.

In one embodiment, the solid sample is not reacted or digested prior to the sonicating. For instance, the solid sample is not subject to chemical reactions or enzymatic digestion other than those occurring naturally by the solid sample (i.e. a decayed vegetation may continue to decompose by its own processes). In some embodiments, the solid sample may be dried and homogenized. The solid sample may be dried by heating at a temperature of 40-80° C., preferably 45-70° C., for 1-4 hours, or by placing in a desiccator or vacuum desiccator. In one embodiment, the solid sample may be homogenized by milling or by a mortar and pestle, while in other embodiments the homogenization may be by a blade grinder.

In one embodiment, during the method, a temperature of the organic solvent does not exceed 50° C., preferably does not exceed 48° C., more preferably does not exceed 45° C. In one embodiment, the sample may be cooled during the sonicating, for instance, by controlling the temperature of the water bath in a bath sonicator. In other embodiments, a maximum temperature reached by the organic solvent may be in a range of 30-80° C., preferably 35-75° C., more preferably 40-70° C., or less than 65° C. In a related embodiment, a maximum temperature reached by the organic solvent may be no greater than 70° C.

In one embodiment, the method further comprises drying the extract to produce a dried extract, and preferably the dried extract is located in a bottom portion of the vial. The drying may be performed with a rotary evaporator, or by letting the vial sit open on a lab bench or in a fume hood. The dried extract may then be resuspended in a second volume of the organic solvent to produce a concentrated extract solution, for instance, when the second volume of organic solvent has a volume is less than the organic solvent used for the extraction. In one embodiment, the second volume may have a volume that is 0.5-60%, preferably 1.0-30%, more preferably 2.0-20%, even more preferably about 10% of the volume of the organic solvent used for the extraction. In some embodiments, a different organic solvent may be used for the concentrated extract solution as compared to the organic solvent used for the extraction. In alternative embodiments, the extract may be diluted to a greater volume (and thus lower concentration of extract) than the original volume of organic solvent used for the extraction. Preferably, no filtering step and/or centrifuging step is used on the organic solvent, extract, or concentrated extract solution.

The method also involves directly injecting the concentrated extract solution into a mass spectrometer or a chromatography column (such as within a gas chromatograph) to purify and detect and/or quantify the analyte.

In one embodiment, the mass spectrometer or chromatography column may be part of a GCMS. In one embodiment, a portion of the organic solvent may be injected directly into a GCMS without forming a concentrated extract. In one embodiment, a typical commercial GCMS may be used. The gas chromatography may be coupled with a single mass spectrometer (i.e. GC-MS) or with a plurality of mass spectrometers, i.e., tandem mass spectrometry, such as GC-MS-MS. During the mass spectrometry, the analyte may be fragmented by either positive chemical ionization, for example, with methanol as the chemical ionization reagent, or preferably electron ionization (such as GC-EI-MS). In other embodiments, the detection and quantification of the concentration of analytes in the solid sample is via gas chromatography coupled with a flame ionization detector (FID), a thermal energy detector, a nitrogen-phosphorus detector, or a nitrogen chemiluminescence detector. The carrier gas may be nitrogen, helium, and/or hydrogen. Preferably the carrier gas is helium with a purity of greater than 99.9 mol %, preferably greater than 99.99 mol %, more preferably greater than 99.999 mol %. The stationary phase of the gas chromatography column may be comprised of a methyl siloxane (also known as methyl polysiloxane or dimethyl polysiloxane), phenyl polysiloxane, dimethyl arylene siloxane, cyanopropylmethyl polysiloxane, and/or trifluoropropylmethyl polysiloxane with a film thickness of 0.10-7 μm, preferably 0.15-1 μm, more preferably 0.2-0.5 μm. The column length may be 10-120 m, preferably 15-50 m, more preferably 25-40 m, with an inside diameter of 0.08-0.60 mm, preferably 0.15-0.40 mm, more preferably 0.20-0.30 mm.

The parameters of a GCMS instrument and method of operation, including but not limited to flow rate, temperature, temperature gradient, run time, pressure, sample injection, sample volume, ionization method, ionization energy, and scanning range may be adjusted by a person of ordinary skill in the art to account for differences in samples, equipment, and techniques.

The analyte may be detected by monitoring a known elution time and/or m/z (mass to charge ratio) for a positive signal as compared with a blank sample. An internal standard's m/z may depend on its identity. The analyte may be quantified with a standard addition of an internal standard, such as benz[a]anthracene-$D_{12}$. For quantitation, known concentrations of an internal standard may be added to a solid sample that is divided into aliquots. These aliquots are each extracted and measured by GCMS. Alternatively, aliquots of an analyte extract from a single trial could receive a standard addition. The linear response of the mass spectrometer counts per concentration of internal standard can be extrapolated to quantify an analyte. Additionally, more than one internal standard can be used in order to span a range of molecular masses. Alternatively, standards may be used to calibrate a GCMS prior to analyzing extracted samples.

In an alternative embodiment, gas chromatography may be used for detection and/or quantitation of an analyte without using mass spectrometry. In a related embodiment, the linear trend of the peak areas of the gas chromatogram may be used for quantitation. Generally, a person of ordinary skill in the art may be able to determine the procedure and calculations to quantify and/or detect an analyte based on GCMS data.

In one embodiment, the analyte is detected and/or quantified in a range of 0.5-400 ng per mg solid sample, preferably 1.0-300 ng per mg solid sample, more preferably 2.0-200 ng per mg solid sample. In one embodiment, the limit of detection (LOD) of an analyte may be in a range of 0.3-4.0 ng per mg solid sample, preferably 0.5-3.0 ng per mg, more preferably 0.8-2.0 ng per mg.

In one embodiment, a matrix effect of the solid sample for the analyte extraction is in a range of 80-120%, preferably 85-115%, more preferably 90-110%, even more preferably 95-105%. As described here, and in chemical analysis, "matrix" refers to the components of a sample other than the analyte of interest. The matrix can have a considerable effect on the way the analysis is conducted and the quality of the results obtained; such effects are called matrix effects. For example, the polarity of a solvent can have an effect on the partitioning coefficients of the analytes. The most common approach for accounting for matrix effects is to build a calibration curve using standard samples with known analyte concentration and which try to approximate the matrix of the sample as much as possible. This is especially important for solid samples where there is a strong matrix influence. In cases with complex or unknown matrices, a standard addition method may be used. Here, the response of the sample is measured and recorded, for example, using an electrode selective for the analyte. Then, a small volume of standard solution is added and the response is measured again. Ideally, the standard addition should increase the analyte concentration by a factor of 1.5-3, and several additions may be averaged. The volume of standard solution should be small enough to disturb the matrix as little as possible.

The matrix effect (ME %) may be quantitated by the use of the following formula:

$$ME\% = 100\% \times A_{extract}/A_{standard},$$

where $A_{extract}$ is the peak area of analyte when diluted with matrix extract, and $A_{standard}$ is the peak area of analyte in the absence of matrix. The concentration of analyte in both standards should be the same. A matrix effect close to 100%, indicates an absence of matrix influence. A matrix effect in a range of 80-120%, indicates a small contribution from the matrix. Matrix effect values of less than 100% indicate suppression, while larger than 100% is a sign of matrix enhancement.

The examples below are intended to further illustrate protocols for ultrasonic extraction of an analyte from a solid sample within a porous membrane bag, and are not intended to limit the scope of the claims. See Sajid, Muhammad; Woźniak, Mateusz Kacper; and Płotka-Wasylkab, Justyna, "Ultrasound-assisted solvent extraction of porous membrane packed solid samples: A new approach for extraction of target analytes from solid samples," *Microchemical Journal*, 144 (2019) 117-123, DOI: 10.1016/j.microc.2018.08.059—incorporated herein by reference in its entirety.

Example 1

Experimental
Materials and Chemicals
A standard mixture of polycyclic aromatic hydrocarbons (PAHs) was purchased from Sigma Aldrich (QTM PAH mix, 2000 µg·mL$^{-1}$ in methylene chloride; USA) and 17 compounds (acenaphthene, acenaphthylene, anthracene, benz[a] anthracene, benzo[b]fluoranthene, benzo[ghi]perylene, benzo[a]pyrene, 2-bromonaphthalene, chrysene, dibenz[ah] anthracene, fluoranthene, fluorene, indeno[1,2,3-cd]pyrene, naphthalene, phenanthrene, pyrene; listed in Table 1 with compound abbreviations) in the standard mixture were considered for analysis. Benz[a]anthracene-D$_{12}$ was also obtained from Sigma Aldrich (USA) and used as an internal standard (IS). HPLC-grade solvents (acetone and n-hexane) were purchased from Fisher (Loughborough, UK). A polypropylene (PP) flat membrane sheet roll (Type PP 1E (R/P), pore size: 0.1 µm, wall thickness: 100 µm) was obtained from Membrana (Germany).

Collection and Preparation of Soil Samples
The real samples were collected from the surface of the road, and 5 cm under this point, to present differences between concentration of selected PAHs in surface soil samples and in samples 5 cm below the surface.

All samples were transported to the laboratory. Then, they were dried and homogenized. For preparation, 25 g of soil was spiked with 1.25 mL of PAHs standard solution (stock solution: 1 µg/cm$^3$) dissolved in 20 mL of acetone. Such prepared soil was used for further experiments.

Fabrication of Extraction Device and Extraction Procedure
The membrane bag was prepared by heat-sealing the edges of a porous polypropylene (PP) membrane sheet. One end was kept open for the filling of solid soil samples. 2.5 mg of soil sample (spiked with standard mixture of PAH or real) was filled and the remaining open end was heat-sealed closed. The dimensions of the membrane device were 0.8 cm×0.8 cm. The membrane device was placed in a 4 mL glass vial, and extraction solvent was added. Then, the vial was subjected to an ultrasound bath, and the extraction was allowed to take place for 25 min. The membrane device was then removed from the vial, and the extract was dried in a stream of nitrogen gas. Then, n-hexane (100 µL) was added into the vial to reconstitute the analytes. The resulting extract was then transferred to a 200 µL insert and injected into a GC-MS for analysis.

Each experiment was conducted in triplicate. The parameters that affect the efficiency of extraction and were studied include extraction solvent type, extraction solvent volume, extraction time, and ultrasound power. Extraction efficiency was evaluated based on comparison of chromatographic response.

Preparation of Stock Solutions, Calibrators, and Quality Control Samples
Stock solution of analytes was prepared in methanol by diluting the certified standard solution to reach a concentration of 10 µg/mL. Stock solution of IS (benz[a]anthracene-D$_{12}$) was prepared also in methanol at a concentration of 10 µg/mL. All solutions used for calibration and validation were stored at −20° C.

The calibrators (n=3) were prepared in methanol by diluting the stock solution of analytes to obtain the concentrations of 12.5, 25, 50, 62.5, 100, 250, 500, 1,000, 2,500, 5,000 ng/mL, which correspond respectively to the concentrations of 0.5, 1, 2, 2.5, 4, 10, 20, 40, 100, 200 ng/mg of soil. The concentration of the IS in each calibrator was maintained at 500 ng/mL (20 ng/mg of soil).

Quality control (QC) samples were prepared in triplicate at two concentration levels within the range of concentrations of calibration solutions: low, 500 ng/mL (LQC; 20 ng/mg soil), and high, 2500 ng/mL (HQC; 100 ng/mg soil), by adding an appropriate volume of stock solution of analytes and the IS to the soil samples followed by extraction procedure and GC-MS analysis. QC samples were used for the evaluation of the repeatability.

GC-MS Conditions

Analyses were performed using GC-MS systems. GC units were coupled with an MPS (MultiPurpose Samper) robotic autosampler and a split/splitless CIS 4 injection system (Cooled Injection System) allowing for programming the temperature of the injection port. This temperature was initially set at 110° C. and ramped up to 270° C. at 10° C./s, which temperature was held to the end of analysis. The Pulsed Splitless mode was used for 1 min with initial injection pressure set at 50 psi for 0.5 min. Subsequently, split (20:1) mode was applied. The separation of analytes was carried out on a Phenomenex ZB-5 MS capillary column (30 m×0.25 mm id, and 0.25 μm film thickness) with helium at a purity of 99.999% as the carrier gas and at a constant flow of 1 mL/min. The oven temperature was programmed at 70° C. for 1 min, then increased to 200° C. at 15° C./min, next increased to 270° C. at 5° C./min, and finally ramped up to 300° C. at 10° C./min and held for 6 min. Post-run conditioning was carried out for 2 min at 300° C. The temperatures of the MS transfer line, ion source, and detector were set at 285° C., 230° C., and 150° C., respectively. The MS was operated in positive mode (electron energy 70 eV). Full-scan acquisition was performed with the mass detection range set at 40-400 m/z to determine retention times of analytes, test oven temperature gradient, and to observe characteristic mass fragments for each compound. For the identification and quantification of the analytes, SIM mode was used with the ions listed in Table 1. All the ions were chosen due to their specificity and abundance.

Table 1 provides information on the retention time and quantitative ion of analytes used for detection.

The matrix effects (ME) of the developed method were evaluated using the procedure described by Matuszewski et al. See B. K. Matuszewski, M. L. Constanzer, C. M. Chavez-Eng, Strategies for the Assessment of Matrix Effect in Quantitative Bioanalytical Methods Based on HPLC-MS/MS, Anal. Chem. 75 (2003) 3019-3030. doi:10.1021/AC020361S, incorporated herein by reference in its entirety. ME were investigated at two concentration levels, similar to QC samples 500 and 2,500 ng/mL, and was calculated by comparing the responses (peak area of each analyte against the peak area of the IS) for appropriate solution of analytes prepared in methanol (sets A, n=3) with those measured in blank soil extracts spiked after extraction procedure with the same analyte amount (sets B, n=3). The following formula was used: ME [%]=B/A*100%.

Example 2

Results and Discussion

Parameters of Extraction Procedure

Several parameters affect the extraction efficiency including extraction solvent type, extraction solvent volume, extraction time, and ultrasound power. Thus, these parameters were examined during this experiment.

Extraction Solvent

The extraction solvent should be carefully selected as it has significant importance in extraction process. Affinity between extraction solvent and analytes in terms of polarity is an important parameter to consider. One mixture of organic solvents (acetone and n-hexane at a 1:1 v/v ratio) and three organic solvents with varying polarity indices (n-hexane, dichloromethane, and toluene) were employed as

TABLE 1

List of target analytes, their retention times, and selected ions for SIM mode.

| L.p. | Detection window (time range) | Compound | Abbrv. | Rt [min] | Quantitative ion | Qualitative ions |
|---|---|---|---|---|---|---|
| 1 | 1 (5-7.5) | Naphthalene | Nap | 6.13 | 128 | 127, 129 |
| 2 | 2 (7.5-10.5) | Acenaphthylene | Acy | 8.65 | 152 | 151, 153 |
| 3 | | 2-Bromonaphthalene | 2-BN | 8.85 | 206 | 127, 208 |
| 4 | | Acenaphthene | Ace | 8.95 | 153 | 154, 152 |
| 5 | | Fluorene | Fl | 9.76 | 166 | 165, 167 |
| 6 | 3 (10.5-12.5) | Phenanthrene | P | 11.52 | 178 | 176, 179 |
| 7 | | Anthracene | Ant | 11.61 | 178 | 176, 179 |
| 8 | 4 (12.5-17) | Fluoranthene | Flu | 14.59 | 202 | 200, 203 |
| 9 | | Pyrene | Py | 15.26 | 202 | 200, 203 |
| 10 | 5 (17-22) | Benz[a]anthracene | BaA | 19.67 | 228 | 226, 229 |
| 11 | | Chrysene | Chry | 19.83 | 228 | 226, 229 |
| 12 | 6 (22-26) | Benzo[b]fluoranthene | BbF | 23.94 | 252 | 250, 253 |
| 13 | | Benzo[a]pyrene | BaP | 25.01 | 252 | 250, 253 |
| 14 | 7 (26-) | Indeno[1,2,3-cd]pyrene | InP | 28.24 | 276 | 277, 274 |
| 15 | | Dibenz[ah]anthracene | DahA | 28.36 | 278 | 276, 279 |
| 16 | | Benzo[ghi]perylene | BghiP | 28.99 | 276 | 277, 274 |
| 18 | 5 | Internal standard | IS | 19.6 | 240 | 236, 120 |

Method Validation

The newly developed membrane supported GC-MS-based method for PAH quantification was validated according to international guidelines in the field of our study in terms of selectivity, linearity, sensitivity or limit of detection (LOD), limit of quantification (LOQ), matrix effect, carry-over effect, recovery, and repeatability.

Figure 2:
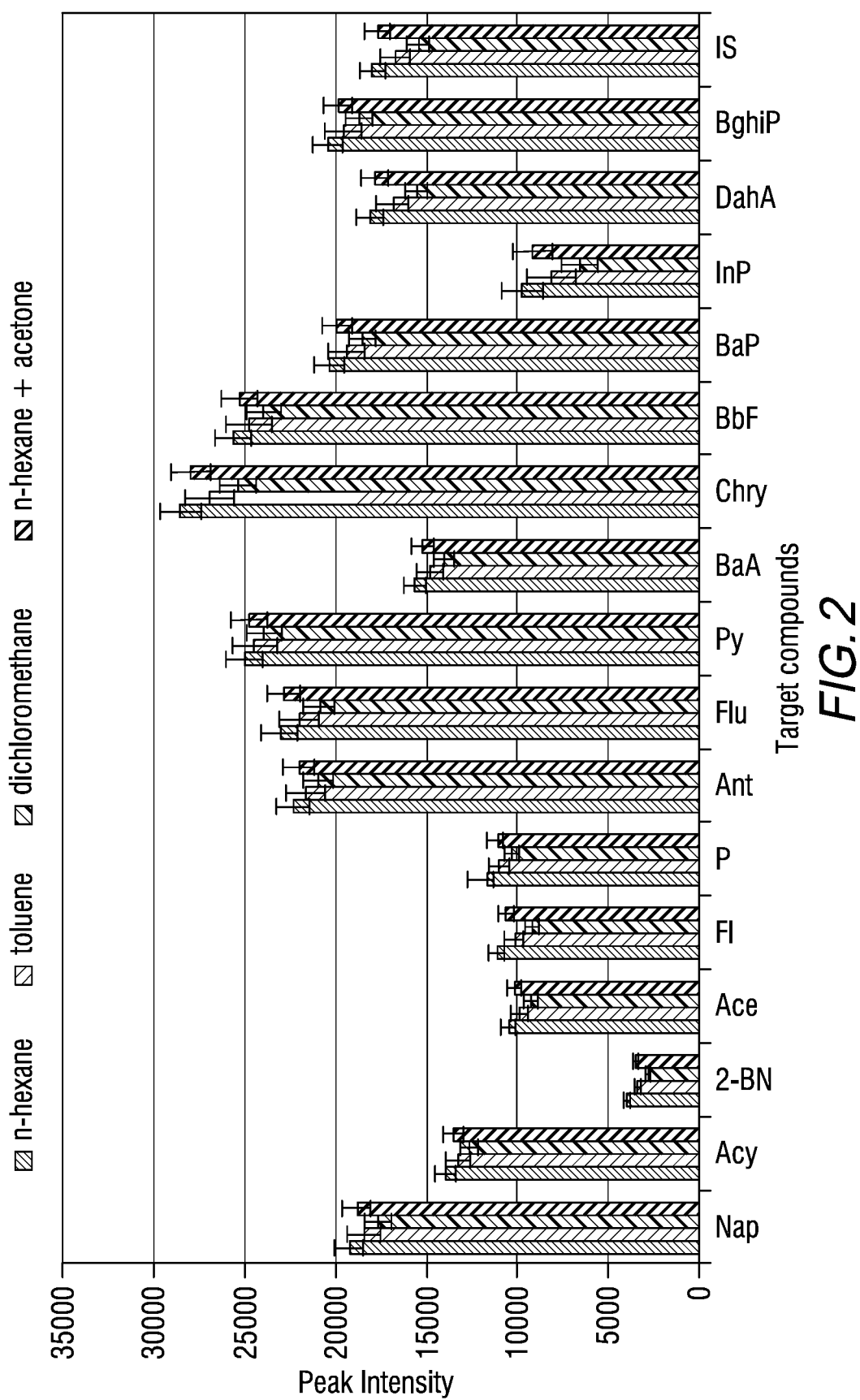
FIG. 2 shows the peak intensities of target compounds when using different extraction solvents.

The selectivity experiments were performed to verify the presence of endogenous or exogenous compounds in the retention times of the analytes and the IS. For this purpose, six soil blank samples obtained using the procedure described previously were analysed after the extraction.

extraction solvents. Of these, n-hexane was found to be the most effective compared to other examined solvents, and it was selected as an advantageous extraction solvent (FIG. 2). PAHs were effectively extracted into n-hexane due to the non-polar nature of both the PAHs and solvent.

To elute the target compounds from porous membrane packed solid samples in a reproducible manner, the volume of extraction solvent should be sufficient to completely immerse the membrane device. In these experiments, we selected a constant volume of solvent as 1 mL, which was enough to completely immerse the solid sample containing membrane bag. After the completion of the extraction, the solvent was evaporated to dryness and reconstituted in 100 µL of n-hexane.

Time of Extraction (Ultra-Sonication)

Figure 3:
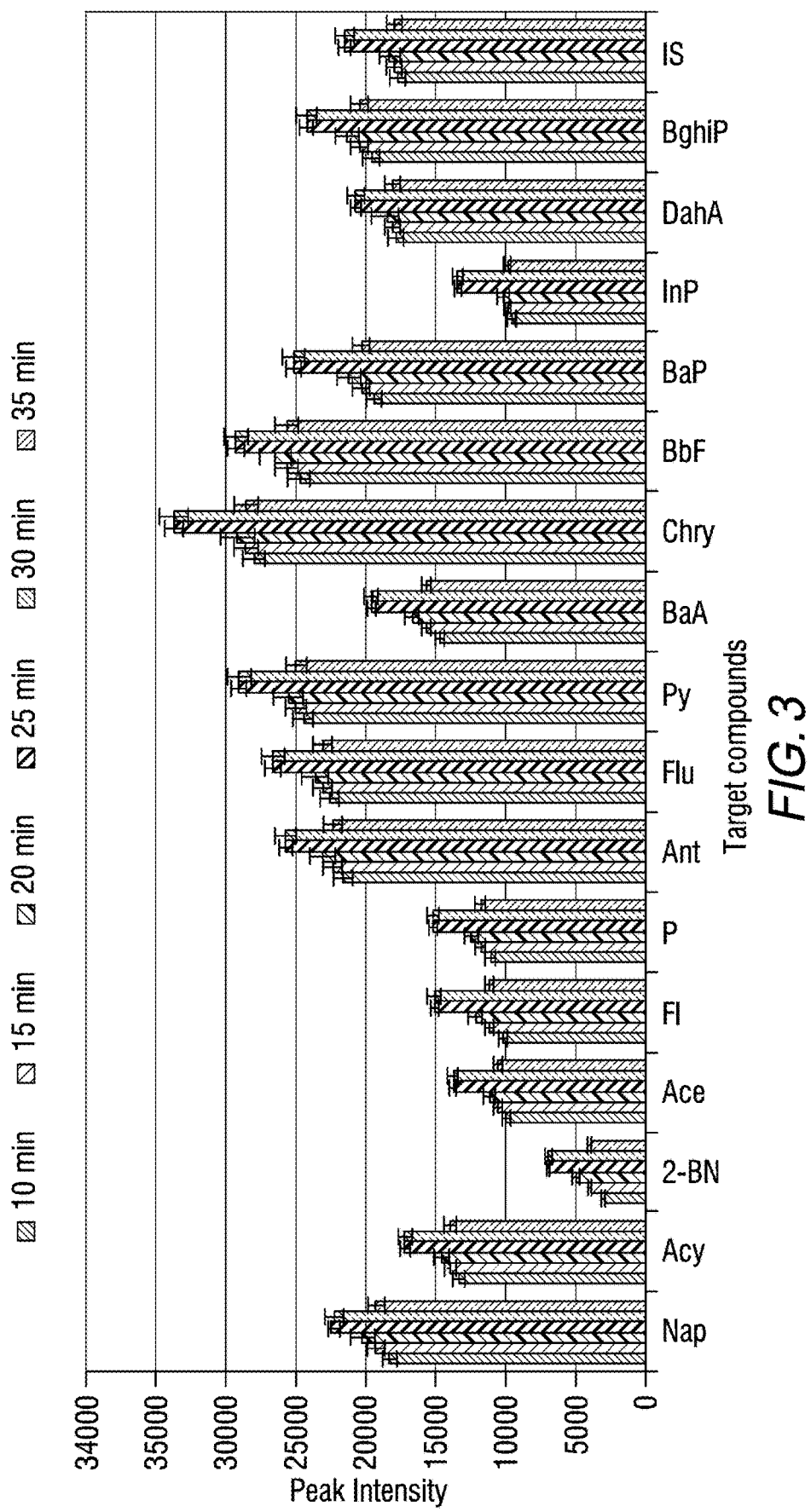
FIG. 3 shows the peak intensities of target compounds based on different extraction times.

Since the procedure proposed here is time dependent, the mass transfer of analytes increases with extraction time until an equilibrium or steady state is attained. Thus, the time of extraction was examined in the range of 10-35 min. After 25 min, no further increase in chromatographic response of analytes was observed until 35 min. However, some decrease was observed. This is attributed to the increase of temperature by longer sonication times, which may evaporate analytes into the headspace where they can escape upon opening the vial. Hence, an extraction time of 25 min was selected (FIG. 3).

Ultrasound Power

Because the extraction process was supported by ultra-sonication, ultrasound power was evaluated in the range of 10 W-100 W. Chromatographic response was increased up to 60 W and then became constant. However, after the application of 80 W and higher powers, a significant decrease in the chromatographic response of the analytes was observed. It can be attributed to the fact that higher ultrasound power can increase temperature, which may result in evaporation of analytes into the headspace over the vial. Hence, 60 W was selected as an ultrasound power.

Method Validation

The developed GC-MS based method includes three ions (1 quantifier and 2 qualifiers). The increased sensitivity, better peak shape, and the better SNR was enabled by advantageous chromatographic conditions, such as the temperature of the injector, the initial and final column temperature, the temperature rate and carrier gas flow rate, as well as the injection mode (split, splitless by different period of the time, and pulsed splitless using various pressure conditions maintained by different time).

No interfering peaks of additional naturally occurring substances in soil in retention times of analytes and the IS which could have obstructed the quantification were reported in the soil blank samples investigated for selectivity. Therefore, the presented method can be considered as specific and selective for the determination of PAH in soil samples. No significant MEs were observed for most analytes, because they were determined in the range of 89.8-111. Such MEs that vary between 80-120% can be perceived as soft and can be neglected. See M. K. Woźniak, M. Wiergowski, J. Aszyk, P. Kubica, J. Namieśnik, M. Biziuk, Application of gas chromatography-tandem mass spectrometry for the determination of amphetamine-type stimulants in blood and urine, J. Pharm. Biomed. Anal. 148 (2018) 58-64. doi: 10.1016/J.JPBA.2017.09.020, incorporated herein by reference in its entirety. The method was shown to be linear within the tested calibration ranges. The details on curves' range for each analyte are shown in Table 2. The linear range and LODs for each analyte are presented also in Table 2. The method recoveries varied from 75.1±4.9% to 106.0±4.5%. The intra-day accuracy and precision ranged from 87.5 to 109%, and 0.8 to 5%, respectively.

Based on the obtained validation parameters, which fulfil the established international criteria for analytical methods, it could be stated that the presented method for the quantification of PAH in soil samples is characterized by high accuracy and precision and can be used for the analysis of real samples.

TABLE 2

Quantification and calibration data for PAH analyzed in this study.

| Analyte | Calibration range [ng/mg] | LOD [ng/mg] |
| --- | --- | --- |
| Naphthalene | 1-200 | 0.32 |
| Acenaphthylene | 0.5-200 | 0.19 |
| 2-Bromonaphthalene | 1-200 | 0.38 |
| Acenaphthene | 1-200 | 0.27 |
| Fluorene | 1.5-200 | 0.53 |
| Phenanthrene | 1-200 | 0.31 |
| Anthracene | 1.5-200 | 0.51 |
| Fluoranthene | 2-200 | 0.60 |
| Pyrene | 0.5-200 | 0.25 |
| Benzo(a)anthracene | 1-200 | 0.34 |
| Benzo(b)fluoranthene | 2-200 | 0.63 |
| Benzo(a)pyrene | 1.5-200 | 0.46 |
| Indeno(1,2,3-cd)pyrene | 2.5-200 | 0.83 |
| Dibenzo(ah)anthracene | 2.5-200 | 0.93 |
| Benzo(ghi)perylene | 2.5-200 | 0.89 |

Analysis of Real Samples

The proposed method was carried out to determine the PAHs levels in the real soil samples. Each measurement was performed four times. It was found that soil samples coming from a village contain lower concentrations of PAHs than those coming from a city center. In addition, in most cases, samples collected 5 cm under the surface are characterized by a lower concentration of PAHs than those collected from the surface of the road.

As shown above, a porous membrane-based method is proposed for the extraction of target analytes directly from solid samples using sonication. This method eliminates many steps associated with conventional sorbent-based membrane extraction. This method involves the packing of solid sample inside a porous polypropylene membrane sheet whose edges are heat-sealed to fabricate a bag. This bag is immersed in a suitable solvent and the analytes are extracted by the application of ultrasound energy. The various factors that affect the extraction performance such as extraction solvent, ultrasonication time, and ultrasound power are suitably tested. The scope of this extraction method is very general; it can be used for the extraction of different classes of analytes from a variety of solid samples using suitable extraction solvents. The beauty of this method lies in the fact that only the small molecules such as analytes can pass through the membrane while the interfering or complex matrix species cannot pass through the membrane bag to the extraction solvent. Previously, the solid samples were first digested/dissolved into liquid medium and then analytes were extracted by membrane-protected adsorbents involving adsorption and desorption steps. With the proposed procedure, the steps of digestion/dissolution and the adsorption of analytes onto a suitable adsorbent are eliminated. Likewise, the steps of filtration and centrifugation are not required as the solid is effectively packed inside the membrane bag. Moreover, the extraction device is low cost, portable, easy to fabricate, and simple to use in extraction process. In this work, proof of the concept is demonstrated by the extraction of polycyclic aromatic hydrocarbon (PAHs) from soil samples. This method provided reasonably low limits of detection (LODs) ranging from 0.19 to 0.93 ng/mg. The intra-day accuracy and precision ranged from 87.5 to 109% and 0.8 to 5%, respectively, while recoveries varied from 75.1±4.9 to 106±4.5%.

The invention claimed is:

1. A method for extracting an analyte from a solid sample, the method comprising:
sonicating the solid sample and an organic solvent in a vial, the vial comprising a porous membrane bag contained within the vial, the porous membrane bag encapsulating the solid sample; and
extracting the analyte from the solid sample to produce an extract within the organic solvent,
wherein the porous membrane bag has an average pore size in a range of from 50 to 150 nm,
wherein the porous membrane bag and the vial do not contain a solid sorbent.

2. The method of claim 1, wherein the analyte is a polycyclic, aromatic hydrocarbon.

3. The method of claim 2, wherein the analyte is at least one polycyclic aromatic hydrocarbon selected from the group consisting of acenaphthene, acenaphthylene, anthracene, benz[a]anthracene, benzo[b]fluoranthene, benzo[ghi]perylene, benzo[a]pyrene, 2-bromonaphthalene, chrysene, dibenz[a]anthracene, fluoranthene, fluorene, indeno[1,2,3-cd]pyrene, naphthalene, phenanthrene, and pyrene.

4. The method of claim 2, wherein a matrix effect of the solid sample is in a range of from 85 115%.

5. The method of claim 1, wherein the organic solvent is at least one selected from the group consisting of acetone, benzene, cyclohexane, n-hexane, toluene, iso-octane, heptane, dichloromethane, and decane.

6. The method of claim 5, wherein the organic solvent is n-hexane and does not exceed a temperature of 50° C.,
wherein the analyte is at least one polycyclic aromatic hydrocarbon selected from the group consisting of acenaphthene, acenaphthylene, anthracene, benz[a]anthracene, benzo[b]fluoranthene, benzo[ghi]perylene, benzo[a]pyrene, 2-bromonaphthalene, chrysene, dibenz[ah]anthracene, fluoranthene, fluorene, indeno[1,2,3-cd]pyrene, naphthalene, phenanthrene, and pyrene,
wherein the porous membrane bag consists of polypropylene,
wherein the porous membrane bag comprises a porous membrane having an average thickness in a range of from 80 to 120 μm and an average pore size is in a range of from 80 to 120 nm,
wherein the solid sample is present in a range of from 0.5 to 500 mg per cm² exterior surface area of the porous membrane bag, and
wherein the analyte is detected and/or quantified in a range of from 0.5 to 400 ng per mg solid sample.

7. The method of claim 1, wherein the porous membrane bag comprises at least one polymer selected from the group consisting of polypropylene, polyethylene, nylon, polyvinylidene fluoride, and polyethersulfone.

8. The method of claim 7, wherein the porous membrane bag consists of polypropylene.

9. The method of claim 1, wherein the porous membrane bag comprises a porous membrane having an average thickness in a range of from 10 to 200 μm.

10. The method of claim 1, wherein the solid sample comprises a soil and/or a decayed vegetation.

11. The method of claim 1, wherein the solid sample is present in a range of from 1.0 to 5.0 mg per mL organic solvent.

12. The method of claim 1, wherein the solid sample is present in a range of from 0.5 to 500 mg per cm² exterior surface area of the porous membrane bag.

13. The method of claim 1, wherein the solid sample is not reacted or digested prior to the sonicating.

14. The method of claim 1, wherein the solid sample and organic solvent are sonicated for a time in a range of from 20 to 30 min at a power in a range of from 40 to 80 W.

15. The method of claim 1, wherein a temperature of the organic solvent does not exceed 50° C.

16. The method of claim 1, wherein the sonicating is performed with a bath sonicator.

17. The method of claim 1, wherein the sonicating comprises simultaneously digesting the solid sample and extracts the analyte.

18. The method of claim 1, wherein the analyte is detected and/or quantified in a range of from 0.5 to 400 ng per mg solid sample.

19. The method of claim 1, having an analyte recovery of at least 90%.

20. The method of claim 1, further comprising:
drying the extract to produce a dried extract;
resuspending the dried extract in a second volume of the organic solvent to produce a concentrated extract solution; and
directly injecting the concentrated extract solution into a mass spectrometer or a chromatography column, wherein no filtering step and/or centrifuging step is used on the organic solvent, extract, or concentrated extract solution.

* * * * *